Sept. 15, 1959   F. P. VACHA   2,904,767
IMPEDANCE DEVICE
Filed March 8, 1956

*INVENTOR.*
FRED P. VACHA
BY
ATTORNEYS

United States Patent Office 2,904,767
Patented Sept. 15, 1959

2,904,767

IMPEDANCE DEVICE

Fred P. Vacha, Babson Park, Mass., assignor to The Gamewell Company, Newton Upper Falls, Mass., a corporation of Massachusetts Application March 8, 1956, Serial No. 570,340

5 Claims. (Cl. 338—311)

The present invention relates to variable impedance assemblies such as rheostats, potentiometers and the like. More particularly, it concerns improved means for connecting fixed points on an impedance with conveniently accessible terminals, whereby the impedance may be connected with an external electrical circuit.

Variable impedances such as potentiometers are found in a constantly increasing variety of applications, many of which involve extreme conditions including mechanical stresses such as vibration, extremes of temperature, and various atmospheric conditions. An object of this invention is to provide an assembly that will give dependable service in the presence of extreme conditions of the foregoing types.

Various means have been proposed for connecting the ends of impedance windings with soldering terminals or the like. In some cases the ends of wire-wound potentiometers are themselves brought out and fastened to the soldering terminals. However, because of the necessarily appreciable resistivity of the wire, such so-called "self-leads" have the disadvantage that the wiper contact cannot be moved to positions electrically very close to, or substantially at, the end terminals. In applications where the variable connection is specified to move over substantially the entire length of the impedance subtended between the end terminals, such construction is not acceptable.

Another method is to provide separate lead-in wires of low impedance from the soldering lugs to the impedance winding, these wires being welded, brazed or soldered to the ends of the impedance. Such soldered connections can be made relatively close to positions reached by the movable wiper contact on the impedance; but the method necessarily involves the inherent limitations arising from the fusion of dissimilar metals. Whereas such fused connections may offer no appreciable difficulty in many applications, they may cause failure as a result of extreme temperature variations involving several hundreds of degrees, such as are encountered in aircraft controls. This is particularly true where such variations are aggravated by mechanical vibration, in which case fatigue failure because of embrittlement, breakage of the connection, and an open circuit may result. A further object of the invention is to secure the advantage of a low impedance lead-in connection to the variable impedance, while avoiding the use of a fused connection between dissimilar metals that may become embrittled under the intended conditions of use.

With the above and other objects in view, a feature of this invention resides in the use of spring contact lead-in wires secured to the terminals and bearing resiliently upon the impedance winding, the bearing pressure of these wires arising solely from the resiliency inherent in the wires themselves.

Another feature resides in an assembly of end terminals on a potentiometer having the above feature, the terminals being connected by means of lead-in wires with an annular impedance winding so that the wiper contact moves through only a small arc in passing from connection with one end terminal to connection with the other. This angle may be reduced, in fact, substantially to the minimum allowable for the given voltage rating of the potentiometer.

Other features of the invention reside in certain features of construction and modes of assembly which will be more clearly understood from the following description thereof, and from the appended drawings illustrating the same.

In the drawings, Fig. 1 is an end elevation, partly broken away, of a preferred form of the invention especially but by no means exclusively adapted for potentiometers of relatively larger sizes, for example three inches or more in diameter.

Figure 1:
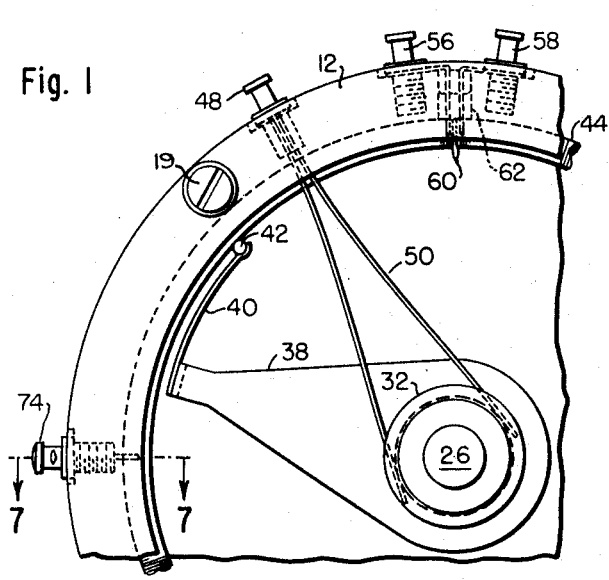

Referring to the drawings, there is shown a potentiometer assembly especially adapted for precision application, which combines a rugged construction with other desirable features including a very small angle subtended between the end connections to the impedance winding. A body 12 formed of a suitable insulating material is provided with complementary end faces 14 and 16 to facilitate the nesting or ganging of a number of impedances, if desired. In the present instance only a single section is illustrated. The housing of the potentiometer is completed by a pair of metal end plates 18 and 20 secured to the body 12 by screws such as 19. The plates 18 and 20 are provided with bearings 22 and 24 to receive a rotor shaft 26. The shaft 26 has suitable annular grooves to receive retaining rings 28 for restraining the shaft against axial displacement with respect to the housing.

The rotor assembly is preferably constructed as described in detail in my copending application Serial No. 570,339, filed on even date herewith. This assembly includes a collector ring bushing 30 of insulating material having a flange 32, a metallic collector ring 34 received over the bushing and provided with an annular groove 36, and a collector ring extension 38 fastened in any suitable manner to the collector ring. At the end of the extension 38 there is provided a wiper arm 40 welded to the extension and bearing a wiper 42 at its end. The wiper is a short length of round wire soldered to the wiper arm and bearing resiliently upon a toroidally-wound, annular impedance element 44.

The impedance 44 is constructed in any suitable manner, as for example by winding a resistance wire about a mandrel consisting of an insulated copper wire, and bending the mandrel about a suitable diameter to fit within the body 12 and against a shoulder 46 more or less centrally located therein. The impedance is held in this position by glue, varnish, or any other suitable means adapted to the intended ambient conditions of use.

Figure 3:
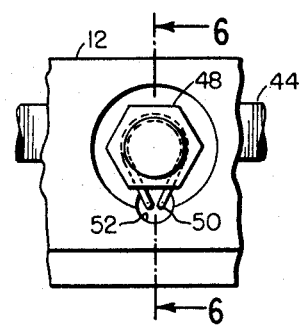
Fig. 3 is a plan view of the brush terminal illustrated in Fig. 1.
Figure 6:
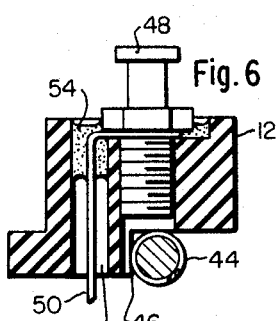
Fig. 6 is a view in section taken on line 6—6 of Fig. 3.

A brush terminal 48 is threaded in a counterbored hole in the body 12. A spring wire brush 50 (Figs. 1, 3 and 6) is looped about the base of the terminal and its two ends bent over and extended inwardly through a hole 52 in the body 12. A quantity of cement 54 fills the counterbore about the terminal and a portion of the hole 52. The free ends of the brush 50 bear slidably and resiliently upon substantially opposing faces of the annular groove 36 in the collector ring 34.

Figure 2:
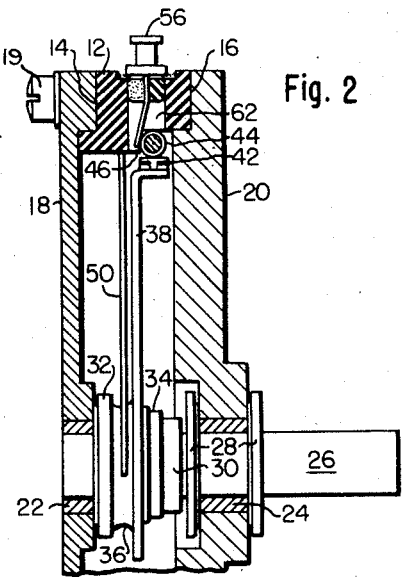
Fig. 2 is a side elevation in section of the embodiment shown in Fig. 1.
Figure 4:
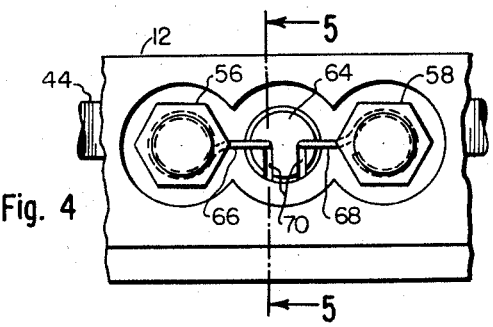
Fig. 4 is a plan view of the end terminals shown in Fig. 1.
Figure 5:
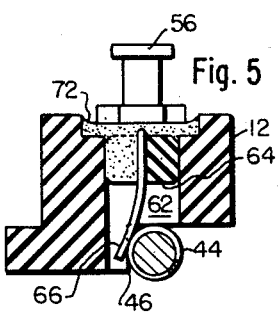
Fig. 5 is a view in section taken on line 5—5 of Fig. 4.
Figure 8:
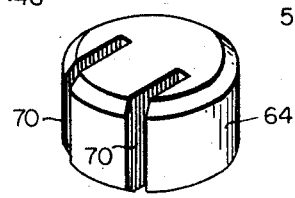
Fig. 8 is an oblique view of the insulating plug shown in Figs. 4 and 5.

The terminal connections to the end and tap terminals of the impedance are of relatively short length, and are made without soldering, welding, brazing or other process for the fusion of metallic parts. End terminals 56 and 58 are threaded into counterbored holes in the body 12 on either side of the open ends 60 of the impedance winding. Between these terminals there is provided a hole 62 (Fig. 1, 2 and 5), in which is secured a generally cylindrical insulating plug 64 (Fig. 8) of nylon or equivalent material having two parallel slots 70. A pair of spring contact wires 66 and 68 are wrapped about and soldered to the terminals 56 and 58, and bent down through the slots in the plug. Cement 72 fills the counterbores about the terminals, covers the top of the plug 64, and fills each of the slots 70 to hold the wires firmly in place adjacent the roots of the slots as shown in Fig. 4. The contact wires bear resiliently on the ends 60 of the impedance, as shown in Fig. 5.

It will be observed that the location of the contact wires with respect to the impedance winding is determined solely by the space between the slots 70 in the plug 64. These slots can be machined with great accuracy in nylon, and the space between the slots can be made very narrow consistently with the minimum distance requirement imposed by the voltage to which the impedance may be subjected in use. It is thus possible to obtain end connections to the impedance which subtend a very small arc, whereby the impedance may be varied over an angular range in excess of 359°. Also, since the contact wires are very short, their impedance length is so low as to be substantially negligible, and the contact resistance is also low since the wires bear upon the impedance with very high unit pressure of the order of 10,000 or more p.s.i.

Figure 7:
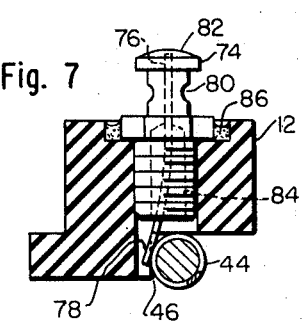
Fig. 7 is a view in section taken on line 7—7 of Fig. 1.

A tap terminal 74 is threaded into a counterbored hole in the body 12 (Fig. 7) in much the same way as that previously described for the brush and end terminals. However, this terminal has an accurate bore 76 in which a spring contact wire 78 is received with only such slight clearance as is necessary for insertion. The terminal may also be crimped about the wire as indicated at 80. A bore 84 of larger diameter than the bore 76 passes through the lower part of the terminal permitting the wire 78 to flex as shown in Fig. 7 and to bear resiliently upon the impedance 44. The wire does not make contact with the terminal 74 throughout the bore 84, so that the wire is free to flex as shown in Fig. 7. The end of the wire bears against the winding 44 and does not bear against the body 12. Cement 86 fills the counterbore about the terminal. The construction of the terminal assembly as shown in Fig. 7 is such that accurate angular location in the body 12 of the drilled and tapped hole for the terminal 74 will assure the precise electrical tap angle desired. However, where necessary, this electrical tap angle may be slightly altered by a minute angular displacement of the free end of the terminal wire.

From the foregoing description it will be appreciated that the variable impedance assembly according to this invention is capable of use in highly exacting applications involving great precision with the smallest possible angle subtended between the end connections to the impedance winding; and furthermore, the connections to the impedance are made by means of extremely high unit contact pressure afforded by the conducting spring contact lead-in wires bearing thereon. For these reasons, the potentiometer may be used under conditions involving very severe vibration without danger of embrittlement or destruction of the end or brush connections. By reason of the absence of fused metallic connections, the dangers of fatigue failure thereof, and of embrittlement due to the phenomena associated with the fusion of dissimilar metals, are eliminated.

Having thus described the invention, I claim:

1. A variable impedance assembly having, in combination, a body, an impedance winding supported by the body, a pair of terminals supported on a side of the body opposite the winding, the body having a hole extending from said side to a point adjacent the winding, an insulating member received in the hole and having a pair of openings therethrough in predetermined precisely separated relationship, and a pair of spring contact wires secured to the terminals, passing through and being secured in said openings, and bearing resiliently on the impedance.

2. A variable impedance assembly having, in combination, a body, a substantially toroidal impedance winding having ends in closely spaced relationship and being supported by the body, a pair of terminals supported on a side of the body opposite the ends of said winding, the body having a hole extending from said side to a point adjacent the winding, an insulating member received in the hole and having a pair of openings therethrough in predetermined precisely separated relationship, and a pair of spring contact wires secured to the terminals, passing through and being secured in said openings, and bearing resiliently on the ends of said impedance.

3. A variable impedance assembly having, in combination, a body, a substantially toroidal impedance winding having ends in closely spaced relationship and being supported by the body, a pair of terminals supported on a side of the body opposite the ends of said winding, the body having a hole extending from said side to a point adjacent the winding, a generally cylindrical plug of insulating material received in the hole and having a pair of slots lying generally parallel with its axis in predetermined precisely separated relationship, and a pair of spring contact wires secured to the terminals, passing through the slots and being firmly secured adjacent the roots thereof, and bearing resiliently on the ends of said impedance.

4. A variable impedance assembly having, in combination, a body having a hole therethrough, an impedance winding supported by the body with a portion thereof generally in line with said hole, a terminal supported in the hole and provided with a narrow bore in the portion remote from said winding and a relatively larger bore substantially concentric therewith in the portion adjacent said winding, and a cantilever spring contact wire secured in said narrow bore, deflected transversely of the axis thereof, and bearing resiliently on said winding without contacting the wall of said larger bore.

5. A variable impedance assembly having in combination, a body having a hole therethrough, a substantially toroidal impedance winding supported by the body with a portion thereof generally in line with said hole, said hole having its axis radial to the axis of said winding, a terminal supported in the hole and provided with a narrow bore in the portion remote from said winding and a relatively larger bore substantially concentric therewith in the portion adjacent said winding, and a cantilever spring contact wire secured in said narrow bore, deflected transversely to the axis thereof, and bearing resiliently on said winding without contacting the wall of said larger bore.

References Cited in the file of this patent

UNITED STATES PATENTS

| | | |
|---|---|---|
| 1,523,404 | Cormack | Jan. 20, 1925 |
| 2,662,149 | Wilentchik | Dec. 8, 1953 |
| 2,806,928 | Woods et al. | Sept. 17, 1957 |